April 17, 1951   J. D. McNABB   2,548,991
ELECTRICAL CIRCUIT TESTER
Filed Aug. 13, 1947
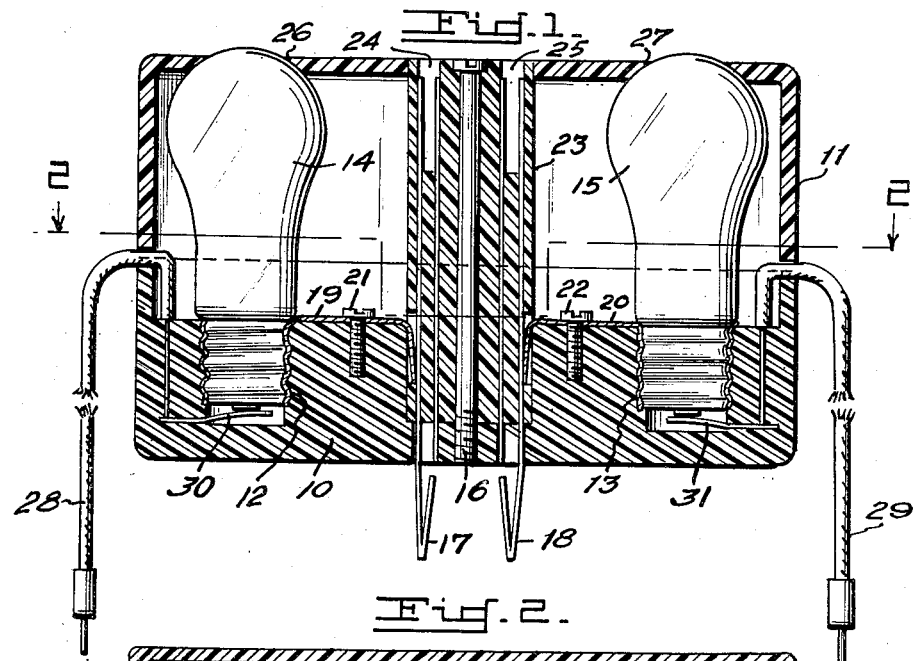
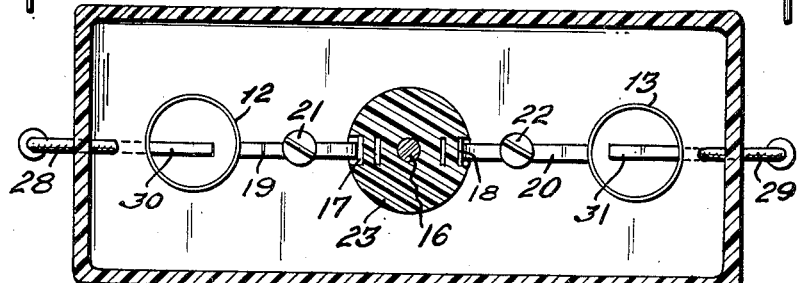
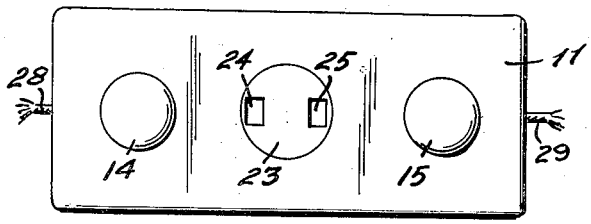
Inventor
James D. McNabb
By Randolph & Beavers
Attorneys Patented Apr. 17, 1951

2,548,991

UNITED STATES PATENT OFFICE 2,548,991

ELECTRICAL CIRCUIT TESTER

James D. McNabb, Los Angeles, Calif.

Application August 13, 1947, Serial No. 768,395

1 Claim. (Cl. 175—183)

The present invention relates to electrical circuit testers, and it consists in the combinations, constructions and arrangements of parts herein described and claimed.

It is an object of the present invention to provide a compact, inexpensive yet efficient testing apparatus for electrical circuits.

A further object of the invention is the provision of an electrical circuit tester which is simple in construction and economical in its operation.

A further object of the invention is the provision of novel arrangement of parts in an electrical circuit tester.

Other and further objects of the invention will become apparent from a reading of the following specification taken in conjunction with the drawing, in which:

Figure 1 is an elevational sectional view of an embodiment of the invention,

Figure 2 is a sectional view taken along line 2—2 of Figure 1,

Figure 3 is a reduced plan view.

Generally, there is provided a two part housing which may be formed of plastic material and which is adapted to be held togeher by a single screw. A pair of electric lamps is mounted within the apparatus and each is adapted to protrude slightly through the top of the same. A connector is provided at the bottom of the casing for insertion into the conventional convenience outlet. A socket is provided for the connection of the device to be tested and a pair of test leads protrudes from the sides of the casing.

Referring more particularly to the drawing, there is shown therein a casing having a base portion 10 and an upper portion 11. The base portion is provided with sockets 12 and 13 for the reception of electrical lamps 14 and 15, respectively. A vertically extending screw 16 interconnects the base and upper portions of the casing.

Protruding from the base 10 is a pair of male socket members 17 and 18 adapted to electrically connect the device in the conventional convenience outlet. The socket 12 is electrically connected with the member 17 by means of a strip 19 of conductive material and the socket 13 is connected with the members 18 by a like strip 20. The strips 19 and 20 are adapted to be held in position upon the base 10 by means of screws 21 and 22, respectively.

The members 17 and 18 extend upwardly through a column 23 to female socket openings 24 and 25, respectively. A pair of openings 26 and 27 is provided in the top of the casing in order that the lamps 14 and 15 may be exposed to the eye of the observer therethrough.

Test leads 28 and 29 are connected with the lamp contact members 30 and 31, respectively, mounted in the base 10 of the casing.

In operation, the device may be used to check voltages and to provide an indication of the current flow through the electrical appliances and the like under actual operating conditions. It may also be used to check radio tubes and the like since the current drain is so low that even battery type tubes may be checked without danger of being burnt out. In order to test a particular appliance the same may be electrically connected in the socket members 24 and 25 whereupon the leads 17 and 18 are electrically connected with the customary convenience outlet. Thereupon the test leads 28 and 29 may be used in the conventional manner upon the device being tested, that is to say, by following the circuit in the device under investigation with the test leads. If the device under investigation is in good condition, the normal indication would be a full light in one of the lamps and a very dim light in the other and as the circuit of the device in question is followed through there would be a gradual decrease in light in the first lamp and a gradual increase in light in the other as greater and lesser electrical resistance is encountered by the respective lamp circuits. If, however, the device in question were defective, this would be indicated by the sudden lighting or cutting off of light in the test lamps 14 and 15.

While but one form of the invention has been shown and described herein, it will be readily apparent to those skilled in the art that many minor modifications may be made without departing from the spirit of the invention or the scope of the appended claim.

What is claimed is:

A device of the character described comprising a base, a top for said base having a pair of openings therein, a pair of lamps in said base slightly protruding through said openings, a test lead connected to one terminal each of said lamps, a male connector having two prongs each of which is directly connected with one of the other terminals of each of the lamps and said male connector adapted to be inserted in a conventional convenience outlet and a female plug mounted in the top and having each of its leads connected with one of the said other terminals of the lamp male members.

JAMES D. McNABB.

(References on following page)

REFERENCES CITED

The following references are of record in the file of this patent:

UNITED STATES PATENTS

| Number | Name | Date |
|---|---|---|
| 1,835,882 | Krippner | Dec. 8, 1931 |
| 2,049,224 | Ribble et al. | July 28, 1936 |
| 2,186,212 | Scoggin | Jan. 9, 1940 |
| 2,195,975 | Ribble et al. | Apr. 2, 1940 |
| 2,229,927 | Kamper | Jan. 28, 1941 |
| 2,289,187 | Gardner | July 7, 1942 |
| 2,316,072 | Judisch | Apr. 6, 1943 |

FOREIGN PATENTS

| Number | Country | Date |
|---|---|---|
| 95,103 | Austria | Dec. 10, 1923 |